(12) United States Patent
Tolbert, Jr. et al.

(10) Patent No.: US 7,628,028 B2
(45) Date of Patent: Dec. 8, 2009

(54) SYSTEM AND METHOD FOR COMPRESSOR CAPACITY MODULATION

(75) Inventors: John Willard Tolbert, Jr., Bristol, TN (US); Scott Garrison Hix, Bristol, VA (US); David Turner Monk, Bristol, VA (US); Jerry D. Edwards, Bristol, VA (US)

(73) Assignee: Bristol Compressors International, Inc., Bristol, VA (US)

( * ) Notice: Subject to any disclaimer, the term of this patent is extended or adjusted under 35 U.S.C. 154(b) by 422 days.

(21) Appl. No.: 11/196,182

(22) Filed: Aug. 3, 2005

(65) Prior Publication Data

US 2007/0032909 A1 Feb. 8, 2007

(51) Int. Cl.
*F25B 1/00* (2006.01)
*F25B 49/00* (2006.01)
(52) U.S. Cl. ................................ 62/228.4; 62/229
(58) Field of Classification Search ........ 62/228.1, 62/228.4, 229, 230; 700/276
See application file for complete search history.

(56) References Cited

U.S. PATENT DOCUMENTS

| | | | |
|---|---|---|---|
| 3,874,187 A * | 4/1975 | Anderson ............. 62/230 |
| 4,487,028 A | 12/1984 | Foye | |
| 4,720,981 A | 1/1988 | Helt et al. | |
| 5,012,656 A | 5/1991 | Tamura | |
| 5,025,638 A | 6/1991 | Yamagishi et al. | |
| 5,052,186 A * | 10/1991 | Dudley et al. ............. 62/79 |
| 5,081,846 A | 1/1992 | Dudley et al. | |
| 5,144,812 A | 9/1992 | Mills, Jr. et al. | |
| 5,177,972 A | 1/1993 | Sillato et al. | |
| 5,220,809 A | 6/1993 | Voss | |
| 5,263,335 A * | 11/1993 | Isono et al. ............. 62/228.4 |
| 5,323,619 A * | 6/1994 | Kim ................... 62/160 |
| 5,533,352 A | 7/1996 | Bahel et al. | |
| 5,553,997 A | 9/1996 | Goshaw et al. | |
| 5,568,732 A * | 10/1996 | Isshiki et al. ............. 62/129 |
| 5,651,260 A | 7/1997 | Goto et al. | |
| 6,041,609 A | 3/2000 | Hornsleth et al. | |
| 6,116,040 A | 9/2000 | Stark | |
| 6,172,476 B1 | 1/2001 | Tolbert, Jr. et al. | |
| 6,353,303 B1 | 3/2002 | Ramachandran et al. | |
| 6,375,563 B1 | 4/2002 | Colter | |
| 6,434,960 B1 | 8/2002 | Rousseau | |
| 6,523,361 B2 | 2/2003 | Higashiyama | |
| 6,560,980 B2 | 5/2003 | Gustafson et al. | |
| 6,663,358 B2 | 12/2003 | Loprete et al. | |
| 6,688,124 B1 | 2/2004 | Stark et al. | |

(Continued)

FOREIGN PATENT DOCUMENTS

CN 2401835 U 10/2000

(Continued)

*Primary Examiner*—Marc E Norman
(74) *Attorney, Agent, or Firm*—McNees Wallace & Nurick LLC

(57) ABSTRACT

A system and method is provided to control and operate a compressor to have two or more discrete output capacities in response to an outdoor temperature measurement. During operation of the compressor in an air conditioning or cooling mode, the compressor has a first output capacity in response to the outdoor temperature being greater than a first temperature setpoint and the compressor has a second output capacity in response to the outdoor temperature being less than a second temperature setpoint.

33 Claims, 11 Drawing Sheets

U.S. PATENT DOCUMENTS

| | | |
|---|---|---|
| 7,164,242 B2 | 1/2007 | Federman et al. |
| 2004/0237551 A1 | 12/2004 | Schwarz et al. |
| 2004/0237554 A1 | 12/2004 | Stark et al. |
| 2004/0261441 A1 | 12/2004 | Turner et al. |
| 2005/0086959 A1 | 4/2005 | Wilson et al. |
| 2007/0022765 A1 | 2/2007 | Lifson et al. |
| 2007/0095081 A1 * | 5/2007 | Ootori et al. ............... 62/176.3 |

FOREIGN PATENT DOCUMENTS

| | | |
|---|---|---|
| JP | 62029853 A | 2/1987 |
| JP | 01296038 A | 11/1989 |

* cited by examiner

SYSTEM AND METHOD FOR COMPRESSOR CAPACITY MODULATION

BACKGROUND OF THE INVENTION

The present invention relates generally to a control system for a compressor. More specifically, the present invention relates to a capacity modulation system for a compressor that can automatically adjust the capacity of the compressor.

Frequently, motors for driving compressors in heating, ventilation and air conditioning (HVAC) systems are designed to operate from standard line (main) voltages and frequencies (e.g., 230 V, 60 Hz) that are available at the location where the HVAC system is being operated. The use of line voltages and frequencies results in the motor being limited to one operating speed that is based on the input frequency to the motor. The operation of the motor at one speed, in turn, results in the compressor being limited to a single output capacity. Furthermore, motors that require their own controller or electronic drive, e.g., switched reluctance motors, cannot be used for these HVAC systems, as such motors cannot operate directly from standard (main) voltages and frequencies.

One problem with the compressor being limited to a single output capacity is that the compressor, especially reciprocating compressors, can produce excess capacity at reduced outdoor ambient temperatures. The excess capacity produced by the compressor adversely affects any system incorporating the compressor during SEER (Seasonal Energy Efficiency Rating) testing and in subsequent operation of the system. One attempt to solve the excess capacity problem in a compressor is discussed in U.S. Pat. No. 6,663,358, wherein a valve internal to the compressor is adjusted in response to operating conditions to effect a change in the capacity of the compressor. However, this mechanical solution may not be able to efficiently and cost-effectively obtain the desired reduction in capacity.

Therefore, what is needed is a cost-effective, efficient and easily implemented system to electrically provide for reduced compressor capacity at reduced outdoor ambient temperatures.

SUMMARY OF THE INVENTION

An embodiment of the present invention is directed to a method for modulating capacity in a compressor for an HVAC&R system. The method includes the steps of providing a compressor and a motor to power the compressor, measuring an outdoor ambient temperature and comparing the measured outdoor ambient temperature to a first predetermined temperature setpoint. The method also includes operating the motor for the compressor at a first output frequency and corresponding voltage in response to the measured outdoor ambient temperature being greater than the first predetermined temperature setpoint. Operation of the motor at the first output frequency and voltage results in a first output capacity for the compressor. The method also includes comparing the measured outdoor ambient temperature to a second predetermined temperature setpoint and operating the motor for the compressor at a second output frequency and corresponding voltage in response to the measured outdoor ambient temperature being less than or equal to the second predetermined temperature setpoint. Operation of the motor at the second output frequency and voltage results in a second output capacity for the compressor. Finally, a single speed fan is used with at least one of a condenser arrangement or an evaporator arrangement of the HVAC&R system.

Another embodiment of the present invention is directed to an HVAC&R system having a compressor, a condenser arrangement and an evaporator arrangement connected in a closed refrigerant loop. The condenser arrangement and the evaporator arrangement each have a fan arrangement operating at a single speed. A motor is connected to the compressor to power the compressor. The motor is configured to operate at a first output speed to generate a first output capacity from the compressor and to operate at a second output speed to generate a second output capacity from the compressor. The HVAC&R system also has a control system connected to the motor to power the motor. The control system is configured to provide the motor with a first output frequency and corresponding voltage to generate the first output speed from the motor and the control system is configured to provide the motor with a second output frequency and corresponding voltage to generate the second output speed from the motor. A sensor arrangement measures a parameter corresponding to an outdoor ambient temperature and provides a signal to the control system with the measured parameter. Finally, the control system is configured to provide the motor with the first output frequency and voltage in response to the measured parameter being greater than a first predetermined setpoint and to provide the motor with a second output frequency and voltage in response to the measured parameter being less than or equal to a second predetermined setpoint.

Still another embodiment of the present invention is directed to a method for modulating capacity in a compressor for an HVAC&R system. The method includes providing a compressor and a motor to power the compressor and measuring an outdoor ambient temperature. The method also includes comparing the measured outdoor ambient temperature to a first predetermined temperature setpoint and operating the motor for the compressor at a first output frequency and corresponding voltage in response to the measured outdoor ambient temperature being less than or equal to the first predetermined temperature setpoint. Operation of the motor at the first output frequency and corresponding voltage results in a first output capacity for the compressor. The method further includes providing a plurality of additional temperature setpoints less than the first temperature setpoint, comparing the measured outdoor ambient temperature to each additional temperature setpoint of the plurality of additional temperature setpoints and operating the motor for the compressor at a corresponding additional discrete output frequency and corresponding voltage of a plurality of additional discrete output frequencies and corresponding voltages in response to the measured outdoor ambient temperature being less than or equal to an additional temperature setpoint of the plurality of additional temperature setpoints. Operation of the motor at a corresponding additional discrete output frequency and corresponding voltage results in an additional output capacity for the compressor different from the first output capacity.

A further embodiment of the present invention is directed to a method for obtaining a desired performance from an HVAC&R system. The method including the steps of providing a programmable controller. The programmable controller providing at least one output frequency and at least one output voltage to a motor powering a compressor of the HVAC&R system. The method also including the steps of setting the at least one output frequency and the at least one output voltage provided by the programmable controller to predetermined initial values, determining particular system configurations and conditions for the HVAC&R system, and adjusting the predetermined initial values for at least one of the at least one output frequency or the at least one output voltage in response to the determined particular system configurations and conditions. The method further includes the steps of testing the HVAC&R system with the adjusted values for the at least one of the at least one output frequency or the at least one output voltage being provided by the controller, adjusting the tested values for at least one of the at least one output frequency or the at least one output voltage in response to the determined system performance not being the desired system performance for the HVAC&R system and repeating the steps of testing the HVAC&R system with the adjusted values and adjusting the tested values for at least one of the at least one output frequency or the at least one output voltage until the desired performance for the HVAC&R system is obtained.

One advantage of the present invention is increased system performance, efficiency and capacity control at reduced outdoor ambient temperatures in both heating and cooling modes of operation.

Another advantage of the present invention is that no corresponding adjustment to indoor air flow is needed in response to changes in compressor capacity.

A further advantage of the present invention is that the capacity modulation of the compressor is invisible when compared to a standard single stage compressor.

Another advantage of the present invention is that the motor drive can be used for different types of input power (i.e., multi-voltage and single phase or three phase) and with different types of compressors and motors.

An additional advantage of the present invention is that no additional starting components are needed, e.g., start capacitors and/or relays.

Still another advantage of the present invention is that no crankcase oil heater is needed.

Another advantage of the present invention is that the compressor output can be tuned to a specific system incorporating the compressor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
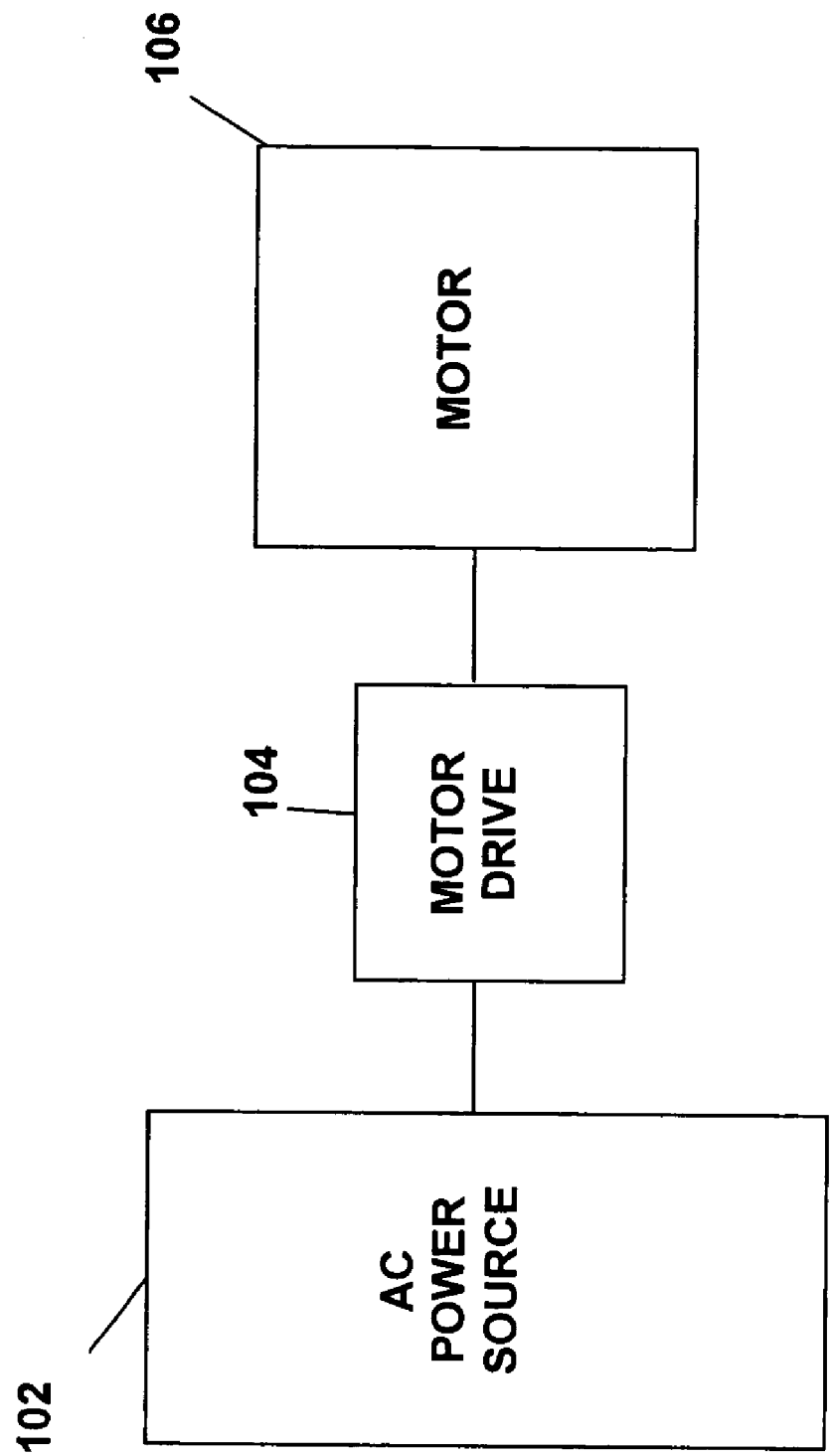
FIG. 1 illustrates schematically a general configuration of the present invention.

FIG. 1 illustrates generally a system configuration of the present invention. An AC power source 102 supplies electrical power to a motor drive 104, which powers a motor 106. The motor 106 is preferably used to drive a corresponding compressor of a HVAC&R system (see generally, FIGS. 3A and 3B). The AC power source 102 provides single phase or multi-phase (e.g., three phase), fixed voltage, and fixed frequency AC power to the motor drive 104. The motor drive 104 can accommodate virtually any AC power source 102, preferably an AC power source 102 that can supply an AC voltage or line voltage of 187 V, 208 V, 230 V, 380 V, 460 V, or 600 V, at a line frequency of 50 Hz or 60 Hz.

The motor drive 104 is preferably a variable speed drive (VSD) or variable frequency drive (VFD) that receives AC power having a particular fixed line voltage and fixed line frequency from the AC power source 102 and provides power to the motor 106 at a desired voltage and desired frequency (including providing a desired voltage greater than the fixed line voltage and/or providing a desired frequency greater than the fixed line frequency), both of which can be varied to satisfy particular requirements. Alternatively, the motor drive 104 can be a "stepped" frequency drive that can provide a predetermined number of discrete output frequencies and voltages, i.e., two or more, to the motor 106.

Figure 2:
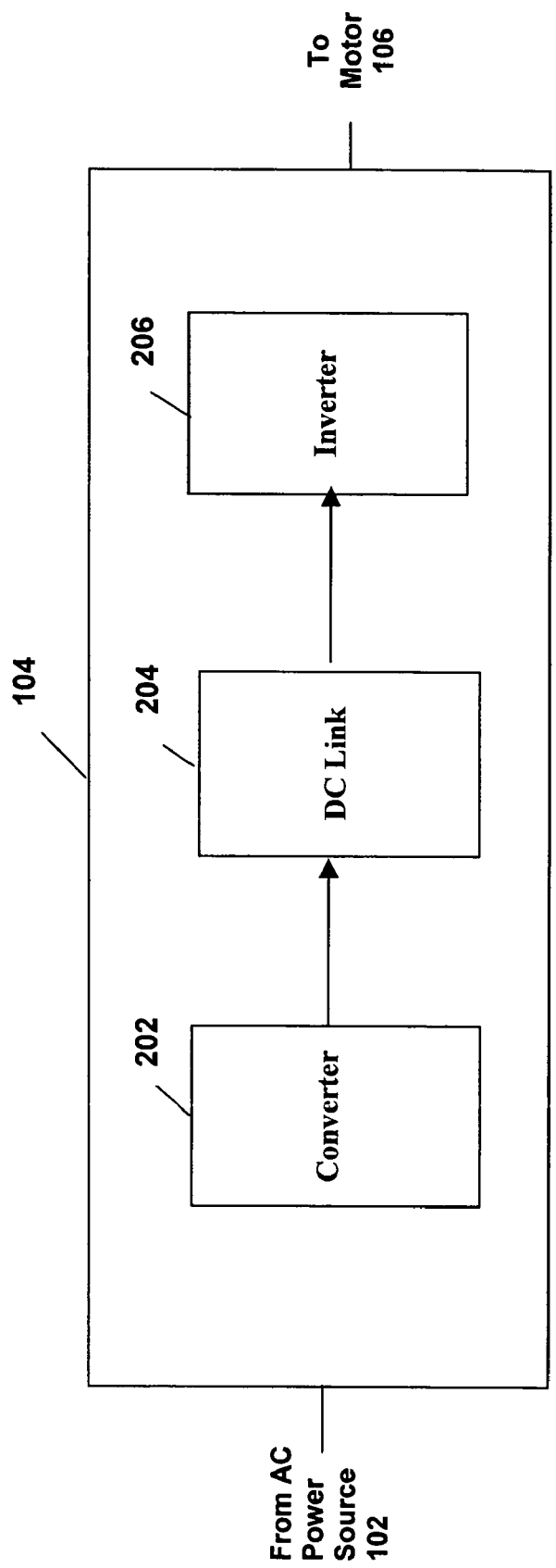
FIG. 2 illustrates schematically an embodiment of a variable speed drive of the present invention.

FIG. 2 illustrates one embodiment of the motor drive (VSD) 104 of the present invention. The VSD 104 can have three stages: a converter/rectifier stage 202, a DC link/regulator stage 204 and an output stage having an inverter 206. The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. The inverter 206 converts the DC power from the DC link 204 into variable frequency, variable voltage power for the motor 106. Furthermore, it is to be understood that the converter 202, DC link 204 and inverter 206 of the VSD 104 can incorporate several different components and/or configurations so long as the converter 202, DC link 204 and inverter 206 of the VSD 104 can provide the motor 106 with appropriate output voltages and frequencies.

The motor drive (VSD) 104 can be used to slowly increase (ramp-up) the speed and/or torque of the motor 106 during a start-up of the motor 106. The ramping-up of the speed and/or torque during start-up can minimize hydraulic forces in the compressor, if liquid refrigerant is present in the oil sump, thereby eliminating the need to preheat oil in the compressor before start-up with a crankcase oil heater.

In addition, in one embodiment of the present invention, the motor 106 can operate from a nominal voltage that is less than the fixed voltage provided by the AC power source 102 and output by the motor drive 104. By operating at a voltage that is less than the fixed AC voltage, the motor 106 is able to continue operation during times when the fixed input voltage to the motor drive 104 fluctuates. For example, the motor can be nominally optimized for approximately 187 V (i.e., the lowest expected voltage for this type of equipment) so any low or high voltage excursions from the normal line voltages are absorbed by the drive and a constant voltage is applied to the motor. This "multivoltage input and output voltage regulator" feature permits one drive to operate on virtually any available AC power source. As is known, the nominal output voltage value of the drive is frequency and load dependent and can vary based on those needs.

Figure 3A:
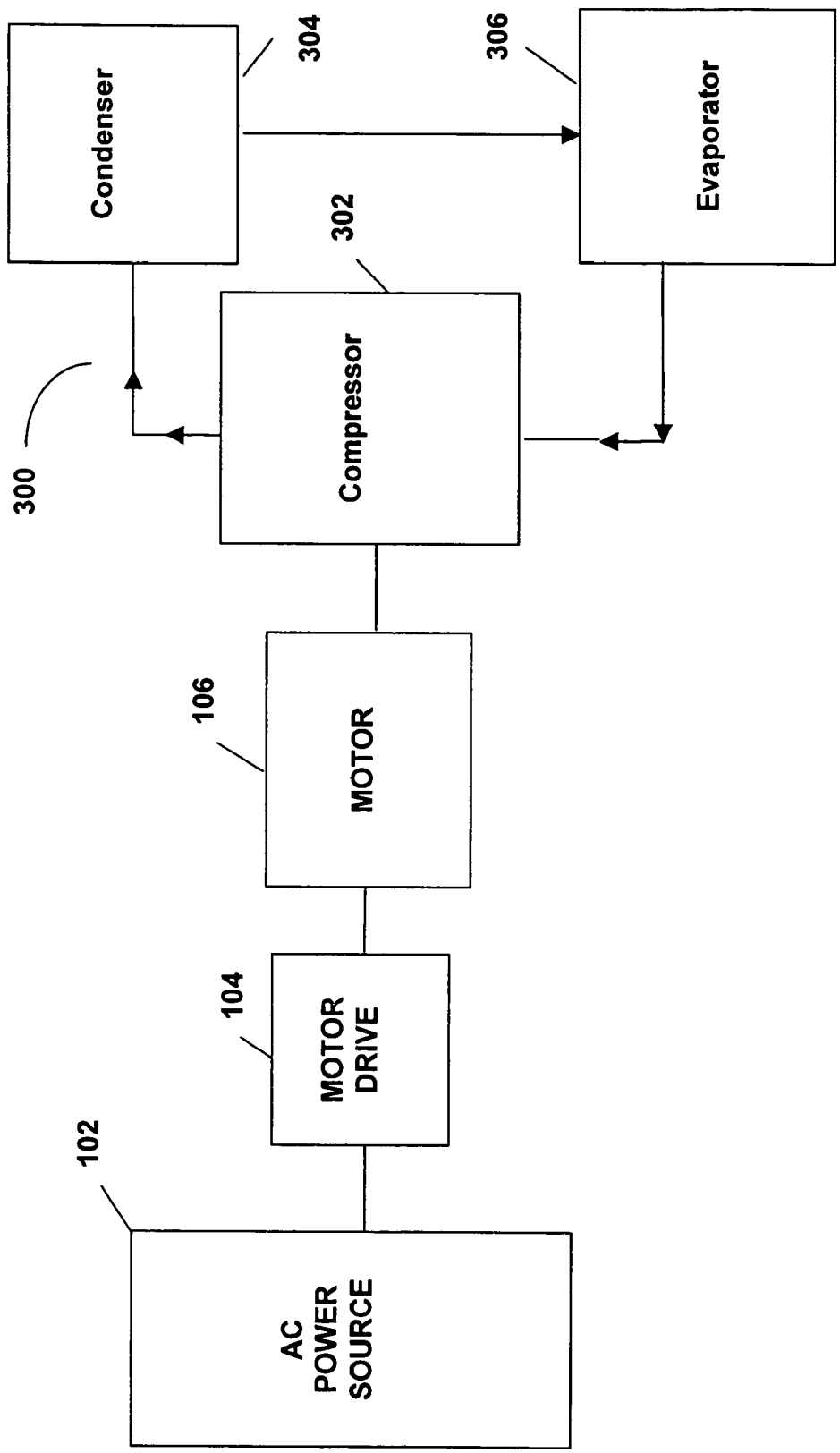
FIGS. 3A and 3B illustrate schematically a refrigeration system that can be used with the present invention.
Figure 3B:
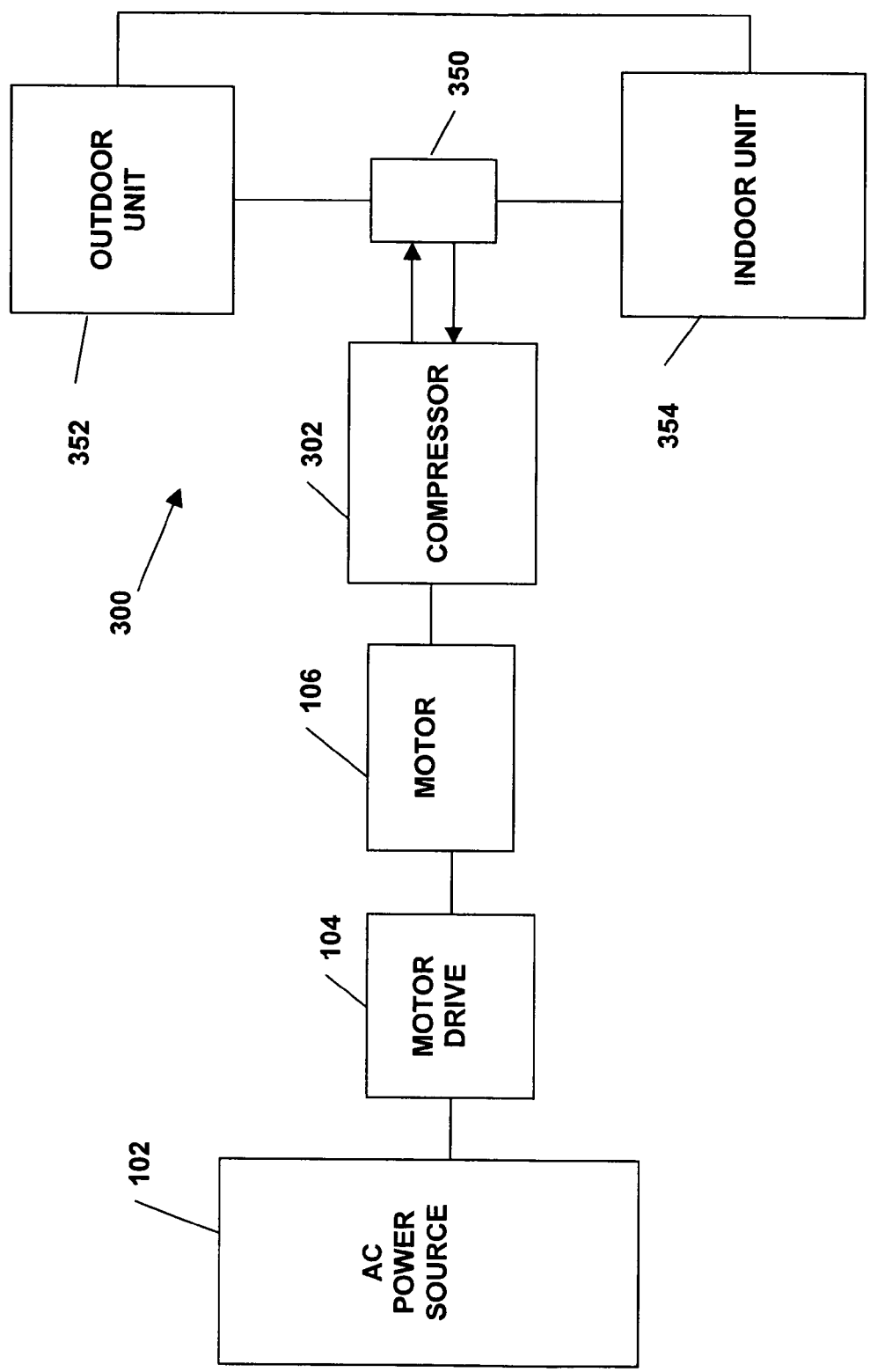

As shown in FIGS. 3A and 3B, the heating, ventilation, air conditioning and refrigeration (HVAC&R) system 300 includes a compressor 302, a condenser arrangement 304, and an evaporator arrangement 306 or a compressor 302, a reversing valve arrangement 350, an indoor unit 354 and an outdoor unit 352. The system 300 can be operated as an air conditioning only system, where the evaporator arrangement 306 is preferably located indoors, i.e., as indoor unit 354, to provide cooling to the indoor air and the condenser arrangement 304 is preferably located outdoors, i.e., as outdoor unit 352, to discharge heat to the outdoor air. The system can also be operated as a heat pump system with the inclusion of the reversing valve arrangement 350 to control and direct the flow of refrigerant from the compressor 302. When the heat pump is operated in an air conditioning mode, the reversing valve arrangement 350 is controlled for refrigerant flow as described above for an air conditioning system. However, when the heat pump is operated in a heating mode, the flow of the refrigerant is in the opposite direction from the air conditioning mode and the condenser arrangement 304 is preferably located indoors, i.e., as indoor unit 354, to provide heating of the indoor air and the evaporator arrangement 306, i.e., as outdoor unit 352, is preferably located outdoors to absorb heat from the outdoor air.

Referring back to the operation of the system 300, whether operated as a heat pump or as an air conditioner, the compressor 302 is driven by the motor 106 that is powered by VSD 104. The VSD 104 receives AC power having a particular fixed line voltage and fixed line frequency from AC power source 102 and provides power to the motor 106. The motor 106 used in the system 300 can be any suitable type of motor that can be powered by a VSD 104. The motor 106 is preferably a switched reluctance (SR) motor, but can also be an induction motor, electronically commutated permanent magnet motor (ECM) or any other suitable motor type. In addition, the preferred SR motor should have a relatively flat efficiency vs. load curve. The relatively flat efficiency vs. load curve indicates that the efficiency of the SR motor does not change significantly with changes in the load. Furthermore, each stator phase in the SR motor is independent of the other stator phases in the SR motor. The independent stator phases enable the SR motor to continue to operate at a reduced power if one of the stator phases should fail.

Referring back to FIGS. 3A and 3B, compressor 302 compresses a refrigerant vapor and delivers the vapor to the condenser 304 through a discharge line (and the reversing valve arrangement 350 if operated as a heat pump). The compressor 302 is preferably a reciprocating compressor. However, it is to be understood that the compressor 302 can be any suitable type of compressor, e.g., rotary compressor, screw compressor, swag link compressor, scroll compressor, turbine compressor, or any other suitable compressor. The refrigerant vapor delivered by the compressor 302 to the condenser 304 enters into a heat exchange relationship with a fluid, e.g., air or water, but preferably air, and undergoes a phase change to a refrigerant liquid as a result of the heat exchange relationship with the fluid. The condensed liquid refrigerant from condenser 304 flows through an expansion device (not shown) to the evaporator 306.

The condensed liquid refrigerant delivered to the evaporator 306 enters into a heat exchange relationship with a fluid, e.g., air or water, but preferably air, and undergoes a phase change to a refrigerant vapor as a result of the heat exchange relationship with the fluid. The vapor refrigerant in the evaporator 306 exits the evaporator 306 and returns to the compressor 302 by a suction line to complete the cycle (and the reversing valve arrangement 350 if operated as a heat pump).

It is to be understood that any suitable configuration of condenser 304 and evaporator 306 can be used in the system 300, provided that the appropriate phase change of the refrigerant in the condenser 304 and evaporator 306 is obtained. The HVAC or refrigeration system 300 can include many other features that are not shown in FIGS. 3A and 3B. These features have been purposely omitted to simplify the drawing for ease of illustration.

In a preferred embodiment of the present invention, the compressor 302 can be controlled and operated to have two or more discrete output capacities in response to an outdoor temperature measurement. Preferably, during operation of the system 300 in an air conditioning or cooling mode, the compressor 302 has a first output capacity in response to the outdoor temperature being greater than a first temperature setpoint and the compressor 302 has a second output capacity in response to the outdoor temperature being less than a second temperature setpoint. Similarly, during operation of the system 300 in a heating mode, the compressor 302 has a first output capacity in response to the outdoor temperature being greater than a temperature setpoint and the compressor 302 has a second output capacity in response to the outdoor temperature being less than the temperature setpoint. Furthermore, single speed fans can preferably be used to provide airflow over the condenser arrangement 304 and the evaporator arrangement 306, regardless of which output capacity is being provided by the compressor 302 in both heating mode and air conditioning mode.

Figure 4:
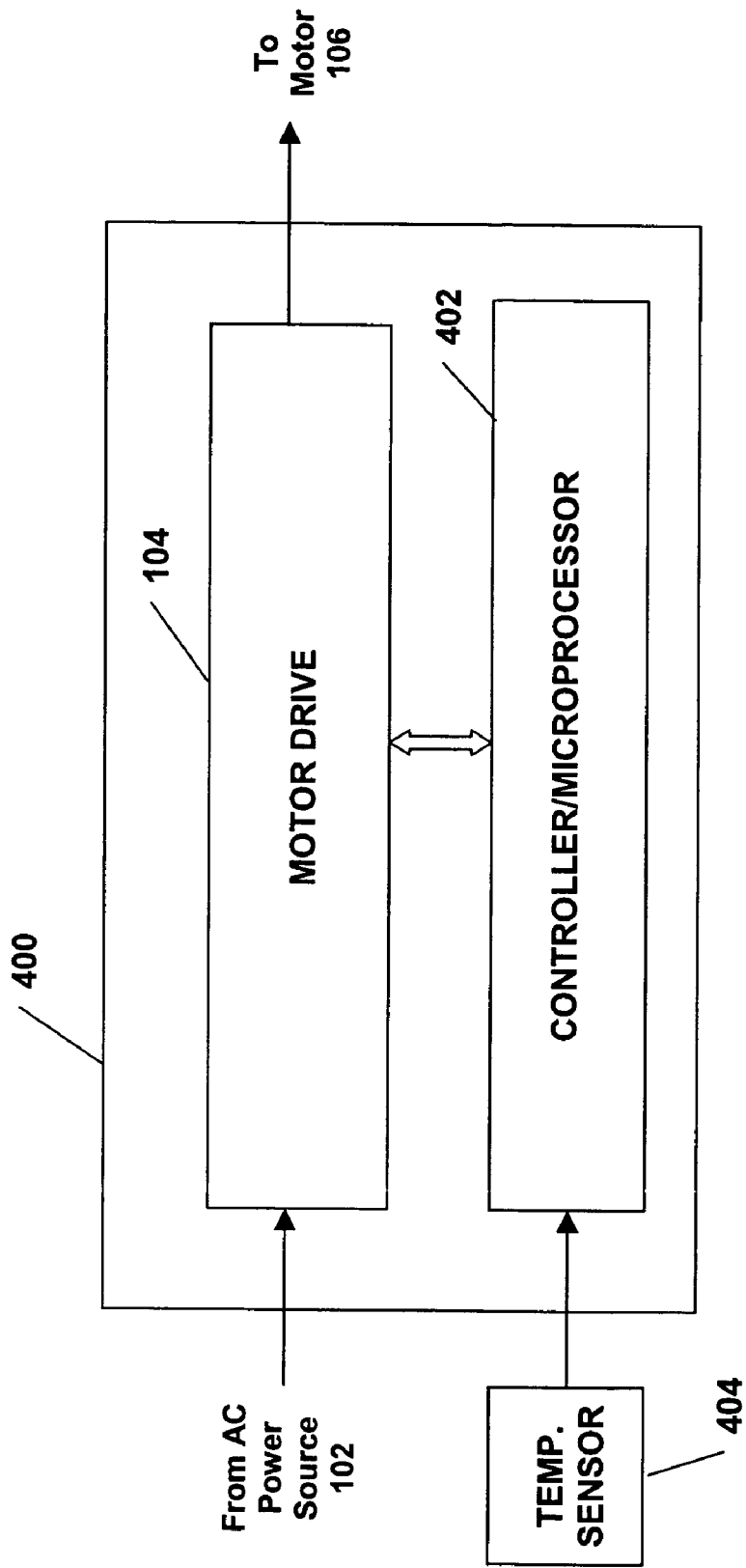
FIG. 4 illustrates schematically an embodiment of a control drive of the present invention.

FIG. 4 illustrates an embodiment of a capacity control system 400 used to provide capacity modulation in the compressor 304. The capacity control system 400 includes the motor/VSD drive 104, as discussed above, to power the motor 106 of the compressor 302. In addition, the capacity control system 400 also includes a controller or microprocessor 402 used to control the operation of the motor drive 104. In a preferred embodiment of the present invention, the controller or microprocessor 402 and the motor drive 104 are integrated on a single circuit board. However, it is to be understood that the controller or microprocessor 402 and the motor drive 104 can be separate from each other.

In addition, a temperature sensor 404 is used to provide a measurement of the outdoor ambient temperature to the controller or microprocessor 402. The temperature sensor 404 can be any suitable device for measuring temperature and can be located in any suitable location that can provide an accurate measurement of the outdoor ambient temperature. Preferably, the controller 402 can be configured to control the output of the motor drive 104 in response to a temperature measurement from the temperature sensor 404.

In another embodiment of the present invention, the controller 402 can control the output of the motor drive 104 in response to other system parameters. For example, the controller 402 can control the motor drive 104 in response to measurements of condenser refrigerant pressure, evaporator refrigerant pressure, liquid line temperature, evaporator refrigerant temperature, condenser refrigerant temperature, suction pressure or temperature, motor current and/or condenser air temperature. It is to be understood that the appropriate sensor is used to measure the desired system parameter. Furthermore, the specific operation of the controller 402 may require modifications to accommodate a particular system parameter in order to provide the two output capacities from the compressor. In still another embodiment of the present invention, the controller 402 can control the output of the motor drive 104 in response to the temperature in the conditioned/enclosed space.

The controller or microprocessor 402 can provide the appropriate control signals to the motor drive 104 to control the output of the motor drive 104, i.e., output voltage and output frequency from the motor drive 104. By controlling the output of the motor drive 104, the controller 402 is able to control the output speed of the motor 106 and in turn, the output capacity of the compressor 302. Preferably, the controller 402 provides control signals to the motor drive 104 that result in one of several discrete output frequencies (and corresponding voltages) being provided to the motor 106 by the motor drive 104. The corresponding voltage to be provided to the motor 106 by the motor drive 104 for a particular output frequency can be either a preset voltage that is selected to provide optimal performance or an adjustable voltage that can be determined by the controller 402 in response to system conditions. The discrete output frequencies and corresponding voltages provided to the motor 106 result in discrete operating speeds for the motor 106 and discrete output capacities for the compressor 302.

In a preferred embodiment of the present invention, the controller 402 can control the motor drive 104 to provide two discrete output frequencies to the motor 106, while providing the appropriate output voltages to maintain optimal motor performance, in response to the outdoor ambient temperature during operation of the system 300 in an air conditioning or cooling mode activated by a control signal. The preferred first output frequency produced by the motor drive 104 is between about 35 Hz and about 55 Hz and is initiated in response to the outdoor ambient temperature being greater than a first temperature setpoint. However, in another embodiment, the first output frequency produced by the motor drive 104 can be between about 70 Hz and about 120 Hz. Operating the motor 106 at the first output frequency results in the compressor 302 providing a first output capacity. The first temperature setpoint can be between about 88° F. and about 95° F. and is preferably 92° F.

The preferred second output frequency produced by the motor drive 104 is between about 28 Hz and about 45 Hz and is initiated in response to the outdoor ambient temperature being less than a second temperature setpoint. However, in another embodiment, the second output frequency produced by the motor drive 104 can be between about 50 Hz and about 100 Hz. Operating the motor 106 at the second output frequency results in the compressor 302 providing a second output capacity that is lower than the first output capacity. The second temperature setpoint can be between about 82° F. and about 88° F. and is preferably 85° F. In addition, the first temperature setpoint and the second temperature setpoint are preferably selected to provide a deadband region between the two temperature setpoints. This deadband region is used to avoid frequent changing of the output frequency of the motor drive 104 between the first output frequency and the second output frequency. The deadband region is preferably between about 2° F. and about 10° F.

The second output frequency is selected to provide a reduction in compressor output capacity, or compressor displacement, of about 15% to about 20%, and preferably about 18%, from the first output capacity of the compressor 302. This reduction in capacity from operation of the motor 106 at the second output frequency occurs automatically and does not require any adjustment of the indoor air flow or fan speed in order to maintain the proper amount of humidity control for the interior space. Thus, a single speed (or tapped) fan can be used with the indoor unit 354 or evaporator 306. Similarly, a single speed fan can also be used with the outdoor unit 352 or condenser 304.

The reduction in compressor capacity can increase the efficiency of the system 300 by providing effectively larger heat transfer surfaces (for the corresponding refrigerant flow) in the condenser arrangement 304 and the evaporator arrangement 306. The reduction in compressor capacity can also provide some noise reduction for the compressor 302 because the compressor 302 has a reduced sound signature at the lower operating frequencies and speed.

Figure 5:
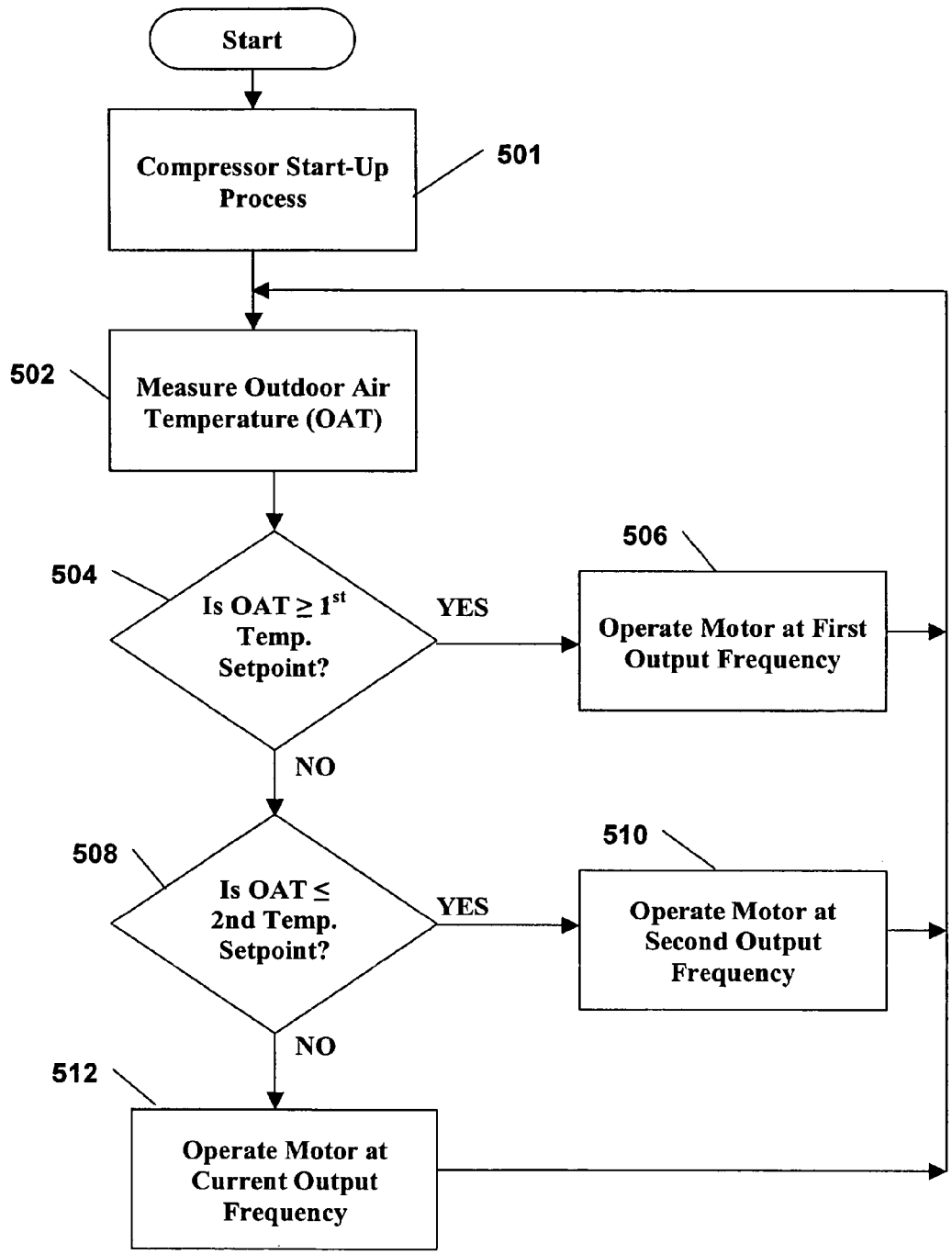
FIG. 5 illustrates a flow chart of one embodiment of the capacity control process of the present invention.

FIG. 5 illustrates a process for capacity modulation of the compressor 302 during operation in an air conditioning mode. The process begins at step 501 where a start-up process for the compressor is executed. The start-up process measures the outdoor ambient temperature with temperature sensor 404 and then proceeds to start-up the compressor 302 to operate at the second output capacity unless the measured outdoor ambient temperature is greater than or equal to the first temperature setpoint, then the start-up process proceeds to start-up the compressor 302 to operate at the first output capacity. Next, in step 502 the outdoor ambient temperature is measured using the temperature sensor 404. In step 504, the measured outdoor ambient temperature is compared to the first temperature setpoint to determine if the measured outdoor ambient temperature is greater than or equal to the first temperature setpoint. If the measured outdoor ambient temperature is greater than or equal to the first temperature setpoint in step 504, then the process proceeds to step 506 where the motor 106 is operated at the first output frequency. The process returns to step 502 to measure the outdoor ambient temperature and repeat the process. If the measured outdoor ambient temperature is not greater than or equal to, i.e., it is less than, the first temperature setpoint in step 504, then the process proceeds to step 508. In step 508, the measured outdoor ambient temperature is compared to the second temperature setpoint to determine if the measured outdoor ambient temperature is less than or equal to the second temperature setpoint. If the measured outdoor ambient temperature is less than or equal to the second temperature setpoint in step 508, the process then proceeds to step 510 where the motor 106 is operated at the second output frequency. The process returns to step 502 to measure the outdoor ambient temperature and repeat the process. If the measured outdoor ambient temperature is not less than or equal to, i.e., it is greater than, the second temperature setpoint in step 508, then the process proceeds to step 512 where the motor 106 is continued to be operated at the current output frequency, either the first output frequency or the second output frequency. The process returns to step 502 to measure the outdoor ambient temperature and repeat the process.

In another embodiment of the present invention, the controller 402 can also control the motor drive 104 to provide a plurality of discrete output frequencies to the motor 106 during operation of the system 300 in a cooling mode. The first output frequency produced by the motor drive 104 is between about 48 Hz and about 55 Hz and is initiated in response to the outdoor ambient temperature being less than an initial temperature setpoint. The initial temperature setpoint can be between about 88° F. and about 95° F. and is preferably 92° F. Operating the motor 106 at the first output frequency results in the compressor 302 providing a first output capacity. The motor drive 104 can also produce a second output frequency of between about 55 Hz and about 60 Hz and in response to the outdoor ambient temperature being greater than the initial temperature setpoint. Operating the motor 106 at the second output frequency results in the compressor 302 providing a second output capacity that is greater than the first output capacity.

Additional cooling mode output frequencies produced by the motor drive 104 are between about 20 Hz and about 45 Hz and are initiated in response to the outdoor ambient temperature being progressively lower than the initial temperature setpoint. Operating the motor 106 at the additional output frequencies results in the compressor 302 providing progressively lower output capacities that are less than the first output capacity. In other words, when the system 300 is operating in a cooling mode, the output frequency produced by the motor drive 104 and the corresponding output capacity of the compressor 302 are progressively decreased as the outdoor ambient temperature progressively decreases below the initial temperature setpoint. Preferably, there are one or more additional "cooling" temperature setpoints at temperatures lower than the initial temperature setpoint discussed above. When the outdoor ambient temperature drops below these additional "cooling" temperature setpoints, the output frequency of the motor drive 104 is correspondingly decreased. For example, additional "cooling" temperature setpoints can be set at about 35° F., about 50° F., about 65° F. and about 80° F. and can result in the motor drive producing corresponding output frequencies of about 30 Hz, about 35 Hz, about 40 Hz and about 45 Hz. In addition, a deadband region(s) can be provided between the "cooling" temperature setpoints for the cooling mode operation to prevent frequent changing of the output frequency of the motor drive 104. It is to be understood that the above temperature setpoints and corresponding frequencies are only examples and any desired or suitable temperature setpoint(s) and corresponding frequencies can be selected and used.

Furthermore, the controller 402 can also control the motor drive 104 to provide a plurality of discrete output frequencies to the motor 106 during operation of the system 300 in a heating mode. The plurality of discrete output frequencies provided to the motor 106 by the controller 402 in the heating mode is related to the output frequencies provided to the motor 106 by the controller 402 in the cooling mode, e.g., the maximum heating mode output frequency is related to the maximum cooling mode output frequency. The preferred first output frequency produced by the motor drive 104 is between about 35 Hz and about 55 Hz and is initiated in response to the outdoor ambient temperature being lower than a "heating" temperature setpoint and/or receiving a signal that the system 300 is operating in a heating mode. The "heating" temperature setpoint can be between about 50° F. and about 70° F. and is preferably 60° F. Operating the motor 106 at the first output frequency results in the compressor 302 providing a first output capacity.

Additional preferred heating mode output frequencies produced by the motor drive 104 are between about 55 Hz and about 90 Hz and are initiated in response to the outdoor ambient temperature being progressively lower than the "heating" temperature setpoint. Operating the motor 106 at the additional output frequencies results in the compressor 302 providing progressively higher output capacities that are greater than the first output capacity. In other words, when the system 300 is operating in a heating mode, the output frequency produced by the motor drive 104 and the corresponding output capacity of the compressor 302 are progressively increased as the outdoor ambient temperature progressively decreases below the "heating" temperature setpoint. Preferably, there are one or more additional "heating" temperature setpoints at temperatures lower than the "heating" temperature setpoint discussed above. When the outdoor ambient temperature drops below these additional "heating" temperature setpoints, the output frequency of the motor drive is correspondingly increased. For example, additional "heating" temperature setpoints can be set at about 35° F., about 40° F., about 45° F. and about 50° F. and can result in the motor drive producing corresponding output frequencies of about 90 Hz, about 80 Hz, about 70 Hz and about 60 Hz. In addition, a deadband region(s) can be provided between the "heating" temperature setpoints for the heating mode operation to prevent frequent changing of the output frequency of the motor drive 104. It is to be understood that the above temperature setpoints and corresponding frequencies are only examples and any desired or suitable temperature setpoint(s) and corresponding frequencies can be selected and used.

In a preferred embodiment of the present invention, the controller 402 is programmable by a user. A user either at the factory (before installation) or in the field (during or after installation) can program the controller 402 to set desired first and second (and additional) operating frequencies in both the heating mode and the air conditioning or cooling mode. In addition, a user can configure the controller to set desired temperature setpoints and deadband regions for both the heating mode and the air conditioning mode. By being programmable, the controller 402 is able to be adjusted to operate the compressor 302 in accordance with particular system configurations and conditions (e.g., condenser and/or evaporator coil size or surface area, amount and type of refrigerant charge, and condenser and/or evaporator airflow) to provide a desired system performance. The programmability of the controller 402 (and compressor 302) may remove the need to change or alter other system components to obtain a desired system performance such that the desired system performance can be obtained by adjusting only the controller 402. The controller 402 can be programmed only one time or can be programmed and erased multiple times. The programmability of the controller 402 enables a single controller/compressor combination to be used with a variety of different types of refrigeration system configurations and still provide a desired system performance for each of the systems.

For example, the controller 402 can provide first and second output frequencies and first and second output voltages. The first and second output frequencies are preferably set to an initial frequency and the first and second output voltages can either be set to an initial voltage or can be determined and set by the controller 402 as discussed above. Next, the particular system configurations and conditions for the HVAC&R system into which the controller 402 and compressor 302 are going to be installed are determined. The initial frequency values for one or both of the first and second output frequencies and possibly one or both of the first and second output voltages can be adjusted in response to the determined system configurations and conditions. The HVAC&R system is then tested with the first and second output frequencies and the first and second output voltages, as adjusted, to determine the performance of the HVAC&R system. One or both of the first and second output frequencies can be further adjusted and possibly one or both of the first and second output voltages can be further adjusted in response to the determined system performance not being the desired system performance. Finally, the testing of the HVAC&R system and the adjusting of one or both of the first and second output frequencies and possibly one or both of the first and second output voltages can be repeated until the desired performance for the HVAC&R system is obtained.

In another embodiment of the present invention, the controller 402 can be used to provide overload and underload protection to the motor 106. The controller 402 can measure the current being provided to the motor 106 by the motor drive 104 with respect to the outdoor ambient temperature measured by the temperature sensor 404 and can take corrective action if an overload or underload condition is present in the motor 106 or motor drive 104. Specifically, there will be a direct relationship between the measured motor current and the outdoor ambient temperature that will determine if an overload or underload condition is present. For example, an overload condition can be determined to be present by exceeding a predetermined outdoor temperature for a specific motor current value.

In still another embodiment of the present invention, an override signal can be provided to override the capacity modulation process set forth above. The override signal can be used to force the operation of the motor 106 at the first output frequency instead of operating the motor 106 at the second output frequency in accordance with signals from the capacity modulation process. The override signal can be generated by a thermostat or other control device or can be provided as a direct or manual input by a user of the system 300. The override signal is used to provide additional or boosted cooling capacity from the compressor 302, i.e., the compressor 302 is operated at the first output capacity instead of the second output capacity, when other conditions and factors take precedence over the lower outdoor ambient temperature control of the capacity modulation process set forth above.

For example, if the temperature in an enclosed space to be cooled is greater than the temperature setpoint for the enclosed space by a predetermined amount and the capacity modulation process is operating the compressor 302 at the second output capacity, the capacity modulation process is overridden and the compressor 302 is operated at the first output capacity. The override control provided by the override signal can be for a predetermined override time period, e.g., 1 hour, or the override control can continue until the condition that triggered the override signal is satisfied, e.g., satisfaction of a temperature setpoint for an enclosed space. Once the override control has ended, the capacity modulation process resumes control of the operation of the compressor 302. In another embodiment, the controller 402 can initiate the override control in response to system conditions, e.g., extended operation at the lower output capacity in either heating or cooling mode of operation. The override control in this embodiment can be terminated as discussed above, i.e., satisfaction of a predetermined time period or of the temperature setpoint for the enclosed space.

Figure 6:
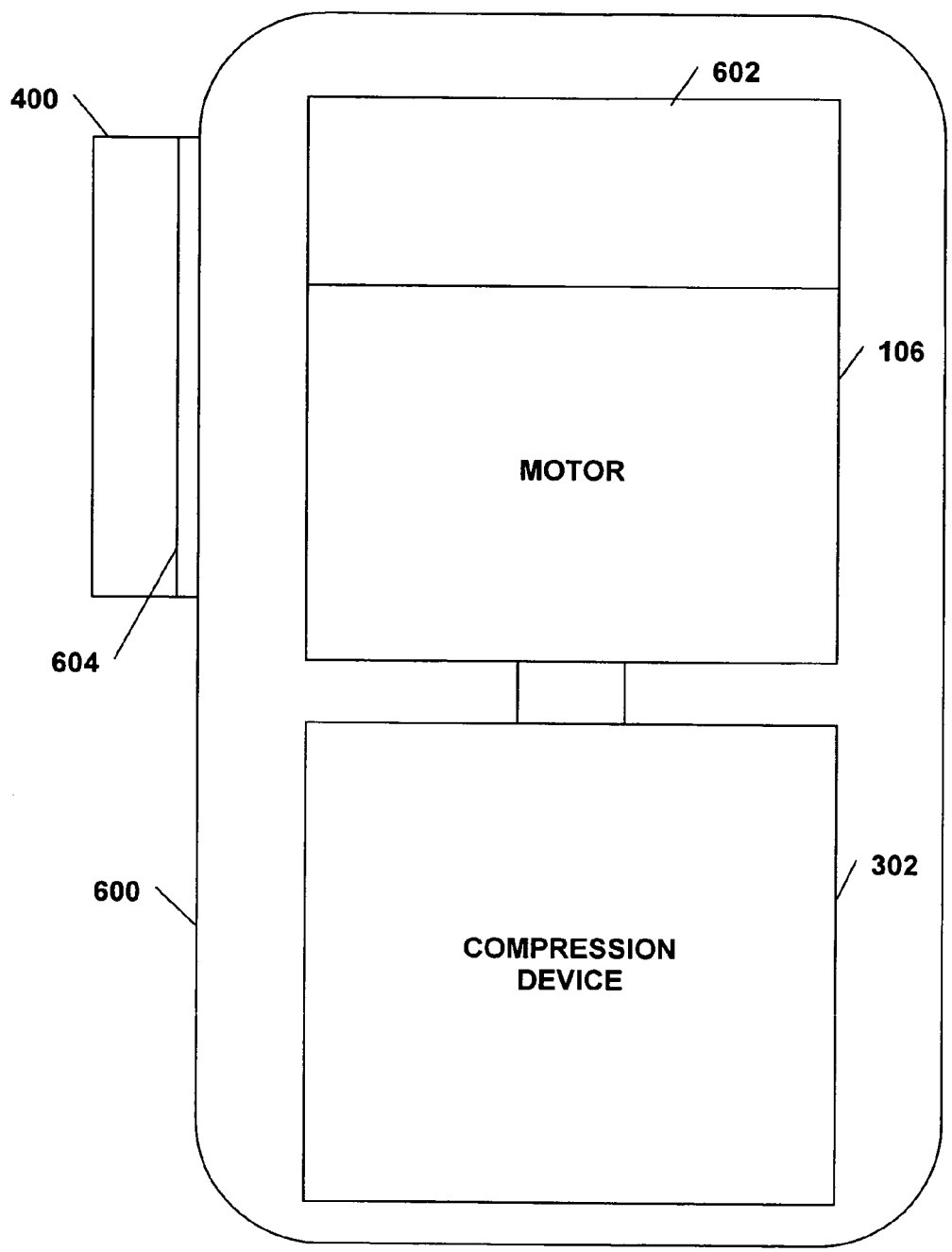
FIG. 6 illustrates an embodiment for mounting the control drive of the present invention.
Figure 7:
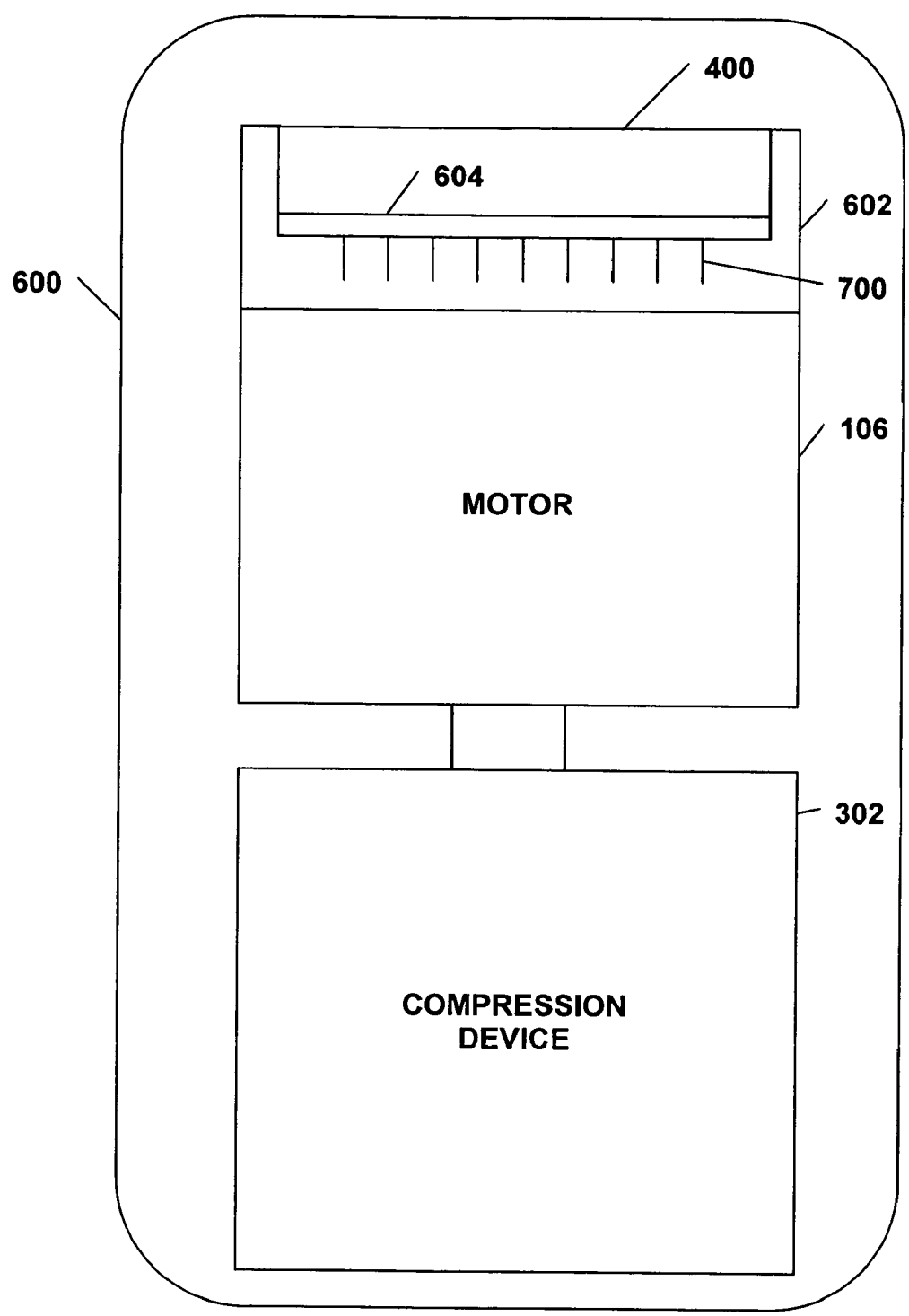
FIG. 7 illustrates another embodiment for mounting the control drive of the present invention.
Figure 8:
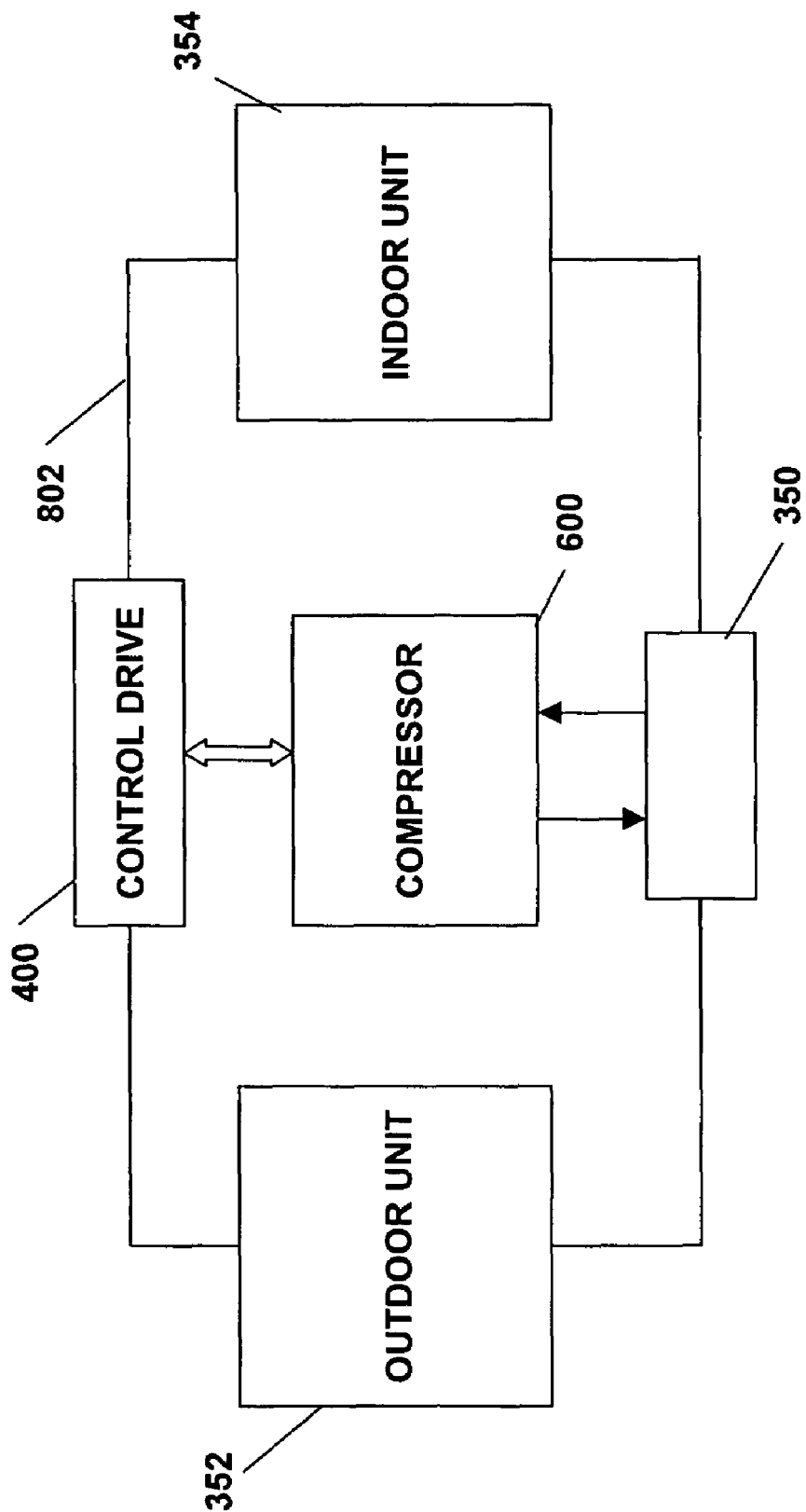
FIG. 8 illustrates an embodiment for cooling the control drive of the present invention.
Figure 9:
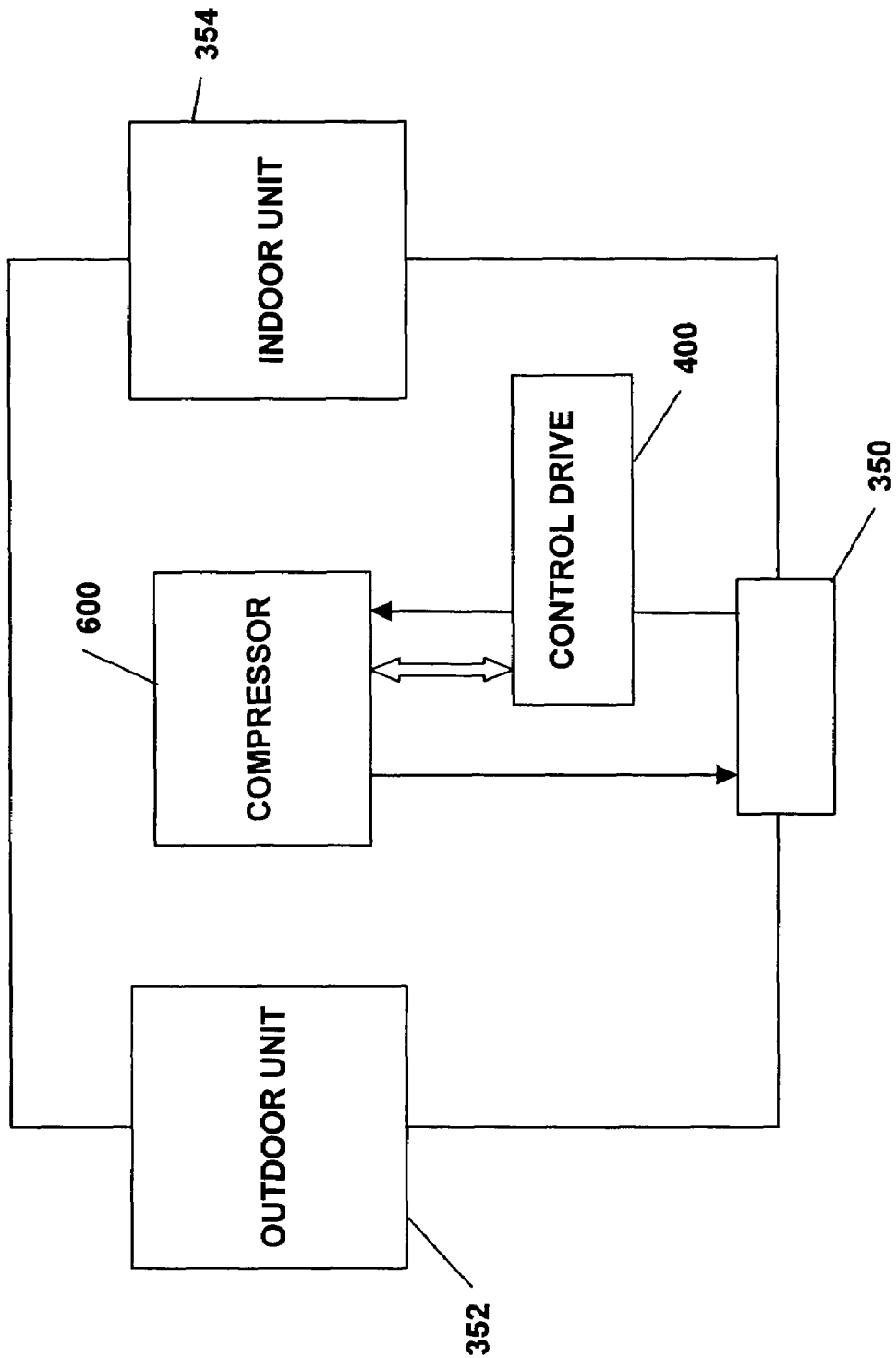
FIG. 9 illustrates another embodiment for cooling the control drive of the present invention.
Figure 10:
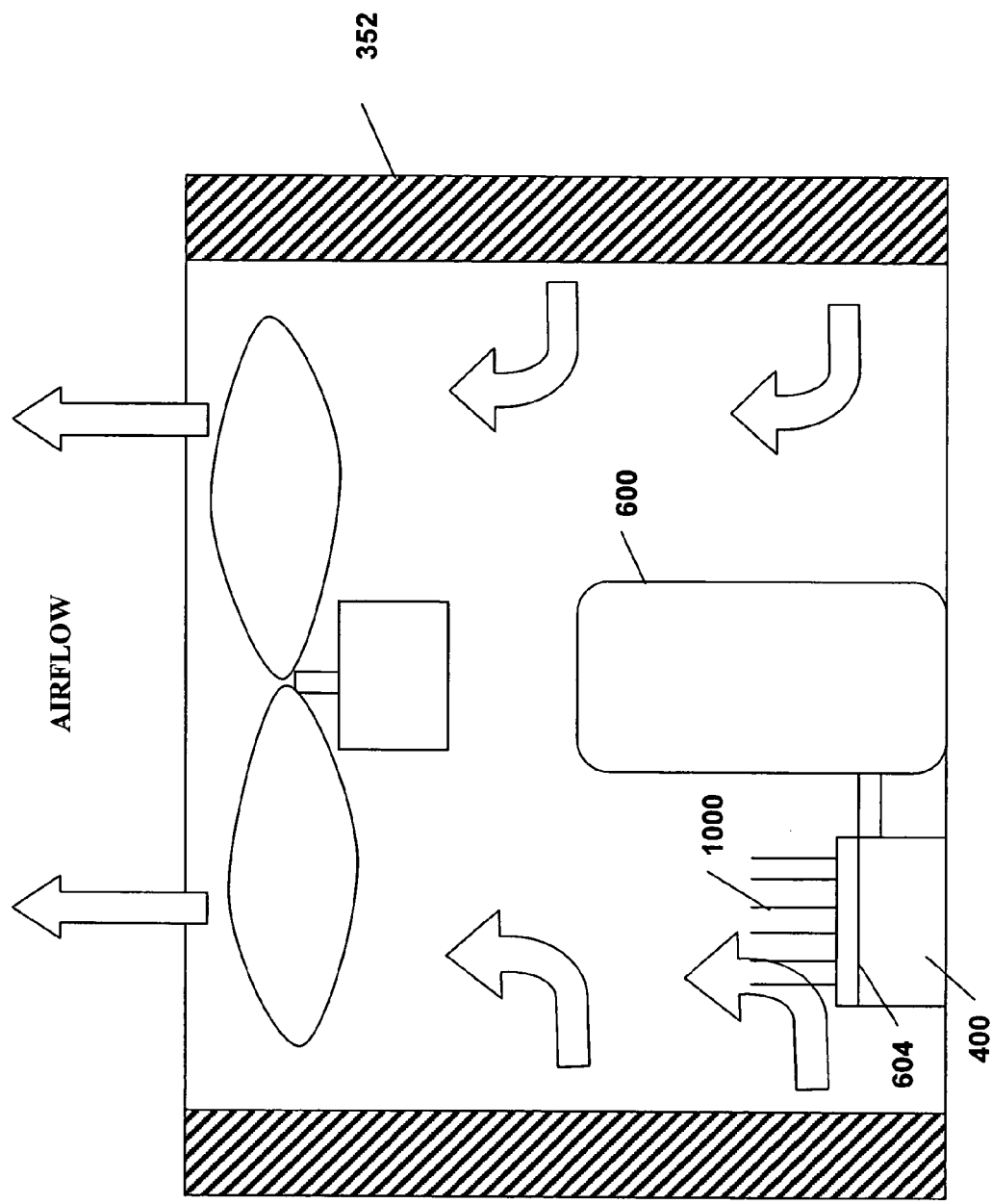
FIG. 10 illustrates still another embodiment for cooling the control drive of the present invention.

FIGS. 6-10 illustrate different configurations for providing cooling to the control drive 400. FIG. 6 illustrates an embodiment where the compressor housing is used as part of the heat sink for the control drive 400. FIG. 7 illustrates an embodiment where the control drive 400 is mounted internal to the compressor housing. FIG. 8 illustrates an embodiment where liquid refrigerant is used to cool a heat sink of the control drive 400. FIG. 9 illustrates an embodiment where vapor refrigerant is used to cool a heat sink of the control drive 400. FIG. 10 illustrates an embodiment where the heat sink of the control drive 400 is air cooled.

As discussed above, FIG. 6 illustrates an embodiment where the compressor housing is used as part of the heat sink for the control drive 400. The compressor or compression device 302 and the motor 106 are mounted in a single housing 600 that is sealed except for the connections for the refrigerant inlet and outlet and the electrical connections between the control drive 400 and the motor 106, which connections are not shown for simplicity. The compressor housing 600 can preferably be flooded with vapor refrigerant from the evaporator 306 that is to be compressed by the compressor or compression device 302. The vapor refrigerant in the compressor housing 600 can be used to cool the motor 106 by drawing the vapor refrigerant over the motor 106 through the use of a motor cap 602.

A heat sink 604 is incorporated into the control drive 400 to transfer heat from the electronic components in the control drive 400 to prevent damage to the electronic components. The control drive 400 is mounted on the exterior of the compressor housing 600 and, in particular, the heat sink 604 of the control drive 400 is mounted on the compressor housing 600. The heat sink 604 can be mounted to the compressor housing 600 in any suitable manner that permits heat transfer from the heat sink 604 to the compressor housing 600. Thus, the entire surface area of the compressor housing 600, via the connection to the heat sink 604, can be used for heat transfer from the electronic components of the control drive 400. The heat transfer provided by the compressor housing 600 can be further enhanced by locating the compressor housing 600 in a place that receives additional airflow, e.g., in the outdoor unit. In another embodiment of the present invention, the heat transfer from the compressor housing 600 can be enhanced by providing one or more fins or projections on the outside surface and/or inside surface of the compressor housing 600.

As discussed above, FIG. 7 illustrates an embodiment where the control drive 400 is mounted internal to the compressor housing. Similar to the arrangement in FIG. 6, the compressor or compression device 302 and the motor 106 are mounted in a single housing 600 that is sealed except for the connections for the refrigerant inlet and outlet and the electrical connections to the control drive 400, which connections are not shown for simplicity. The compressor housing 600 can preferably be flooded with vapor refrigerant from the evaporator 306 that is to be compressed by the compressor or compression device 302. The vapor refrigerant in the compressor housing 600 can be used to cool the motor 106 by drawing the vapor refrigerant over the motor 106 through the use of a motor cap 602.

In this embodiment of the present invention, the control drive 400 is mounted internal to the compressor housing 600 and is cooled by the heat transfer relationship between the vapor refrigerant in the refrigerant housing 600 and the heat sink 604 of the control drive 400. Preferably, the control drive 400 is mounted within the motor cap 602 and is cooled by the same vapor refrigerant used to cool the motor 106. The heat sink 604 can also include one or more fins or projections 700 that extend from the heat sink and into the flow of vapor refrigerant to further enhance the heat transfer capabilities of the heat sink 604. In addition, the control drive 400 can also include insulation or other protective materials to protect the electronic components of the control drive 400 from the harsh environment and materials inside the compressor housing 600, e.g., the vapor refrigerant and oil located inside the compressor housing 600.

As discussed above, FIG. 8 illustrates an embodiment where liquid refrigerant can be used to cool the control drive 400. The refrigerant circuit shown in FIG. 8 is similar to the refrigerant circuit from FIG. 3B. The motor 106 and compression device 302 are combined within the compressor housing 600 as discussed above. In addition, the control drive 400 is mounted separate from the compressor 600 and can receive refrigerant, either in liquid form or in liquid/vapor form, from line 802 between the indoor unit 354 and the outdoor unit 352, i.e., the condenser 304 and the evaporator 306, to cool the electronic components of the control drive 400.

The control drive 400 can be incorporated directly into line 802 to receive refrigerant or can be incorporated into a separate line that is connected to line 802 to receive refrigerant.

The control drive 400 can include a heat sink 604 to cool the electronic components of the control drive 400. The refrigerant from line 802 is used to cool the heat sink 604 either directly or through the use of a plate heat exchanger or other similar device. In addition, an expansion device, e.g., a capillary tube or orifice, can be incorporated in the line before reaching the heat sink 604 or the plate heat exchanger or other similar device cooling the heat sink 604. After cooling the control drive 400, the refrigerant from line 802 can either be returned to line 802 or provided to the suction inlet of the compressor 600 if the refrigerant is in vapor form. In one embodiment of the present invention, the control drive 400 preferably receives refrigerant from line 802 just before the refrigerant would enter an expansion device located in line 802. After cooling the control device 400, the refrigerant would be returned to the expansion device to resume normal flow.

As discussed above, FIG. 9 illustrates an embodiment where vapor refrigerant is used to cool the control drive 400. The refrigerant circuit shown in FIG. 9 is similar to the refrigerant circuit from FIG. 3B. The motor 106 and compression device 302 are combined within the compressor housing 600 as discussed above. In this embodiment, the control drive 400 can be mounted in the suction line to the compressor 600, between the compressor inlet and either the reversing valve arrangement 350 or the evaporator 306. Furthermore, the control drive 400 can be mounted on the compressor 600 or the control drive 400 can be mounted separate from the compressor 600.

The control drive 400 can be incorporated directly into the suction line to receive the refrigerant vapor or can be incorporated into a separate line that is connected to suction line to receive refrigerant vapor. The electronic components of the control drive 400 can be cooled directly with the refrigerant vapor as long as the electronic components have the appropriate protection to prevent damage of the electronic components by the refrigerant vapor and oil. Alternatively, the control drive 400 can include a heat sink 604 to cool the electronic components of the control drive 400. The refrigerant vapor from the suction line can be used to cool the heat sink 604 either directly or through the use of a plate heat exchanger or other similar device. After cooling the control drive 400, the refrigerant vapor is provided to the suction inlet of the compressor 600.

In another embodiment of the present invention, the control drive 400 can be air cooled. The electronic components of the control drive 400 can be cooled directly with the air as long as the electronic components have the appropriate protection to prevent damage of the electronic components. Alternatively, the control drive 400 can include a heat sink 604 to cool the electronic components of the control drive 400. The control drive 400 can be mounted in an area that has a large amount of airflow. For example and as shown in FIG. 10, the control drive 400 can be mounted in the outdoor unit 352. In addition, the heat sink 604 of the control drive 400 can include one or more fins or projections 1000 that are within the airflow to further enhance the heat transfer between the heat sink 604 and the air. Particularly, the control drive board and components can be placed in an enclosed control box from which the heat sink fins 1000 can protrude into the outdoor unit airflow (coil inlet or outlet air). In one embodiment, the enclosed control box for the drive board and components, including the heat sink fins 1000, can be mounted in or on the main control housing for the outdoor unit 352 such that the heat sink fins 1000 can protrude into the outdoor unit airflow to further enhance the heat transfer between the heat sink 604 and the air.

In still another embodiment of the present invention, the control drive 400 can incorporate overheat protection if the control drive 400 becomes too warm. The control drive 400 can include an internal temperature sensor that measures the temperature inside the control drive 400. If the control drive 400 becomes too warm, i.e., the temperature inside the control drive 400 exceeds a predetermined threshold temperature, the control drive can automatically lower the frequency output by the motor drive 104 and/or increase the voltage to the motor 106 without having to shut down the control drive 400. These corrective actions by the control drive 400 permit the control drive 400 to continue limited operation for heating or cooling without having to shut down the control drive 400. If these corrective actions are not effective to lower the temperature of the control drive 400, the control drive 400 includes a shutdown procedure that shuts down the control drive 400 and the system 300.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for modulating capacity in a compressor for an HVAC&R system, the method comprising:
   providing a compressor and a motor to power the compressor;
   measuring an outdoor ambient temperature;
   comparing the measured outdoor ambient temperature to a first predetermined temperature setpoint;
   operating the motor for the compressor at a first preselected output frequency and corresponding voltage in response to the measured outdoor ambient temperature being greater than the first predetermined temperature setpoint, wherein operation of the motor at the first preselected output frequency and corresponding voltage results in a first output capacity for the compressor;
   comparing the measured outdoor ambient temperature to a second predetermined temperature setpoint different from the first predetermined setpoint;
   operating the motor for the compressor at a second preselected output frequency and corresponding voltage in response to the measured outdoor ambient temperature being less than or equal to the second predetermined temperature setpoint, wherein operation of the motor at the second preselected output frequency and corresponding voltage results in a second output capacity for the compressor; and
   wherein a single speed fan is used with at least one of a condenser or an evaporator of an HVAC&R system.

2. The method of claim 1 further comprising the step of repeating either the step of operating the motor for the compressor at a first preselected output frequency and corresponding voltage or the step of operating the motor for the compressor at a second preselected output frequency and corresponding voltage in response to the measured outdoor ambient temperature being between the first predetermined setpoint and the second predetermined setpoint.

3. The method of claim 1 further comprising the step of executing a staff-up process for the compressor.

4. The method of claim 3 wherein the step of executing a staff-up process for the compressor includes slowly increasing motor speed and/or torque during initial starting of the motor.

5. The method of claim 3 wherein the step of executing a staff-up process for the compressor includes the steps of:
measuring an outdoor ambient temperature;
comparing the measured outdoor ambient temperature to the first predetermined temperature setpoint;
operating the motor for the compressor at the first preselected output frequency and corresponding voltage in response to the measured outdoor ambient temperature being greater than or equal to the first predetermined temperature setpoint; and
operating the motor for the compressor at the second preselected output frequency and corresponding voltage in response to the measured outdoor ambient temperature being less than the first predetermined temperature setpoint.

6. The method of claim 1 further comprising the step of programming, by a user, at least one of the first predetermined temperature setpoint, the first preselected output frequency, the second predetermined temperature setpoint, or the second preselected output frequency.

7. The method of claim 1 further comprising the steps of:
measuring a motor current for the motor; and
detecting for an overload condition or an underload condition in the motor using the measured motor current and the measured outdoor ambient temperature.

8. The method of claim 1 wherein the second preselected output frequency is less than the first preselected output frequency and the second output capacity is less than the first output capacity for an air conditioning mode of operation.

9. The method of claim 8 wherein the second output capacity is between about 15% and about 20% less than the first output capacity.

10. The method of claim 9 wherein the second output capacity is about 18% less than the first output capacity.

11. The method of claim 8 wherein the first predetermined temperature setpoint is between about 88° F. and about 95° F., the second predetermined temperature setpoint is between about 82° F. and about 88° F. and the first predetermined temperature setpoint and the second predetermined temperature setpoint are separated by a deadband of between about 2° F. and about 10° F.

12. The method of claim 8 wherein the first preselected output frequency is between about 35 Hz and about 55 Hz and the second preselected output frequency is between about 28 Hz and about 45 Hz.

13. The method of claim 1 wherein the second preselected output frequency is greater than the first preselected output frequency and the second output capacity is greater than the first output capacity for a heating mode of operation.

14. The method of claim 13 wherein the first predetermined temperature setpoint is equal to or greater than the second predetermined temperature setpoint.

15. The method of claim 1 further comprising the steps of:
detecting for an override signal indicating a need for increased compressor capacity;
operating the motor for the compressor at the first preselected output frequency and corresponding voltage in response to the detection of the override signal during a cooling mode operation; and
operating the motor for the compressor at the second preselected output frequency and corresponding voltage in response to the detection of the override signal during a heating mode operation.

16. A method for modulating capacity in a compressor for an HVAC&R system, the method comprising:
providing a compressor and a motor to power the compressor;
measuring an outdoor ambient temperature;
comparing the measured outdoor ambient temperature to a first predetermined temperature setpoint;
operating the motor for the compressor at a first output frequency and corresponding voltage in response to the measured outdoor ambient temperature being less than or equal to the first predetermined temperature setpoint, wherein operation of the motor at the first output frequency and corresponding voltage results in a first output capacity for the compressor;
providing a plurality of additional temperature setpoints less than the first temperature setpolnt;
comparing the measured outdoor ambient temperature to each additional temperature setpoint of the plurality of additional temperature setpoints; and
operating the motor for the compressor at a corresponding additional discrete output frequency and corresponding voltage of a plurality of additional discrete output frequencies and corresponding voltages in response to the measured outdoor ambient temperature being less than or equal to an additional temperature setpoint of the plurality of additional temperature setpoints, wherein operation of the motor at a corresponding additional discrete output frequency and corresponding voltage results in an additional output capacity for the compressor different from the first output capacity.

17. The method of claim 16 further comprising the step of:
configuring the HVAC&R system for heating mode operation; and
wherein the operation of the motor at a corresponding additional discrete output frequency and corresponding voltage results in an additional output capacity for the compressor greater than the first output capacity additional capacity.

18. The method of claim 17 wherein the first predetermined setpoint is between about 50° F. and about 70° F. and the first output frequency is between about 35 Hz and about 55 Hz.

19. The method of claim 18 wherein the plurality of additional temperature setpoints include setpoints of about 35° F., about 40° F., about 45° F. and about 50° F. and the plurality of additional discrete output frequencies include frequencies of about 90 Hz, about 80 Hz, about 70 Hz and about 60 Hz.

20. The method of claim 16 further comprising the steps of:
detecting for a heating signal indicating a need for heating; and
operating the motor for the compressor at the first output frequency in response to the detection of the heating signal.

21. The method of claim 16 further comprising the step of:
configuring the HVAC&R system for cooling mode operation; and
wherein the operation of the motor at a corresponding additional discrete output frequency and corresponding voltage results in an additional output capacity for the compressor less than the first output capacity additional capacity.

22. The method of claim 21 wherein the first predetermined setpoint is between about 88° F. and about 95° F. and the first output frequency is between about 48 Hz and about 55 Hz.

23. The method of claim 22 wherein the plurality of additional temperature setpoints include setpoints of about 35° F., about 50° F., about 65° F. and about 80° F. and the plurality of additional discrete output frequencies include frequencies of about 30 Hz, about 35 Hz, about 40 Hz and about 45 Hz.

24. The method of claim 22 further comprising the step of operating the motor for the compressor at a second output frequency and corresponding voltage in response to the measured outdoor ambient temperature being greater than or equal to the first predetermined temperature setpoint, wherein operation of the motor at the second output frequency and corresponding voltage results in a second output capacity for the compressor greater than the first output capacity.

25. A method for modulating capacity in a compressor for an HVAC&R system, the method comprising:
providing a compressor and a motor to power the compressor;
measuring an outdoor ambient temperature;
comparing the measured outdoor ambient temperature to a first predetermined temperature setpoint;
operating the motor for the compressor at a first preselected output frequency and corresponding voltage in response to the measured outdoor ambient temperature being greater than the first predetermined temperature setpoint, wherein operation of the motor at the first preselected output frequency and corresponding voltage results in a first output capacity for the compressor;
comparing the measured outdoor ambient temperature to a second predetermined temperature setpoint different from the first predetermined setpoint; and
operating the motor for the compressor at a second preselected output frequency and corresponding voltage in response to the measured outdoor ambient temperature being less than or equal to the second predetermined temperature setpoint, wherein operation of the motor at the second preselected output frequency and corresponding voltage results in a second output capacity for the compressor.

26. The method of claim 25 further comprising:
providing a programmable controller, the programmable controller providing at least one output frequency and at least one output voltage to the motor;
setting the at least one output frequency and the at least one output voltage provided by the programmable controller to predetermined initial values;
determining particular system configurations and conditions for the HVAC&R system;
adjusting the predetermined initial values for at least one of the at least one output frequency or the at least one output voltage in response to the determined particular system configurations and conditions;
testing the HVAC&R system with the adjusted values for the at least one of the at least one output frequency or the at least one output voltage being provided by the controller;
adjusting the tested values for at least one of the at least one output frequency or the at least one output voltage in response to the determined system performance not being the desired system performance for the HVAC&R system; and
repeating the steps of testing the HVAC&R system with the adjusted values and adjusting the tested values for at least one of the at least one output frequency or the at least one output voltage until the desired performance for the HVAC&R system is obtained.

27. The method of claim 26 wherein the particular system configurations and conditions for the HVAC&R system include at least one of condenser coil size, evaporator coil size, amount of refrigerant charge, type of refrigerant charge, condenser airflow rate or evaporator airflow rate.

28. The method of claim 25 further comprising continuing to operate the motor at the motor's operating output frequency and corresponding voltage in response to the measured outdoor ambient temperature being between the first predetermined setpoint and the second predetermined setpoint.

29. The method of claim 25 further comprising:
starting the motor for the compressor at the first preselected output frequency and corresponding voltage in response to the measured outdoor ambient temperature being greater than or equal to the first predetermined temperature setpoint; and
starting the motor for the compressor at the second preselected output frequency and corresponding voltage in response to the measured outdoor ambient temperature being less than the first predetermined temperature setpoint.

30. The method of claim 25 further comprising:
detecting a signal indicating a need for increased compressor capacity;
operating the motor for the compressor at the first preselected output frequency and corresponding voltage in response to the detection of the override signal during a cooling mode operation; and
operating the motor for the compressor at the second preselected output frequency and corresponding voltage in response to the detection of the override signal during a heating mode operation.

31. The method of claim 25 further comprising operating the HVAC&R system in an air conditioning mode of operation and the second preselected output frequency is less than the first preselected output frequency and the second output capacity is less than the first output capacity.

32. The method of claim 25 further comprising operating the HVAC&R system in a heating mode of operation and the second preselected output frequency is greater than the first preselected output frequency and the second output capacity is greater than the first output capacity.

33. The method of claim 25 further comprising maintaining humidity control in an interior space without an adjustment of indoor air flow in response to a change between the first output capacity and the second output capacity.

* * * * *

UNITED STATES PATENT AND TRADEMARK OFFICE
CERTIFICATE OF CORRECTION

PATENT NO. : 7,628,028 B2  Page 1 of 1
APPLICATION NO. : 11/196182
DATED : December 8, 2009
INVENTOR(S) : Tolbert, Jr. et al.

It is certified that error appears in the above-identified patent and that said Letters Patent is hereby corrected as shown below:

Column 14, Line 67, "a staff-up process" should read --a start-up process--
Column 15, Line 2, "a staff-up process" should read --a start-up process--
Column 15, Line 6, "a staff-up process" should read --a start-up process--
Column 16, Line 16, "setpolnt;" should read --setpoint--

Signed and Sealed this

Twenty-fifth Day of May, 2010

David J. Kappos
*Director of the United States Patent and Trademark Office*